United States Patent
Yu et al.

(10) Patent No.: US 9,887,827 B2
(45) Date of Patent: Feb. 6, 2018

(54) SECONDARY CELL ACTIVATION/DEACTIVATION IN CARRIER AGGREGATION

(71) Applicants: Ping Yu, Ottawa (CA); Peter Hazy, Ottawa (CA); Xixian Chen, Ottawa (CA); James Jianfeng Weng, Kanata (CA); Ying Shao, Kanata (CA); Patrick Lie Chin Cheong, Kanata (CA); Guoqiang Lu, Kanata (CA); Hong Yu, Kanata (CA)

(72) Inventors: Ping Yu, Ottawa (CA); Peter Hazy, Ottawa (CA); Xixian Chen, Ottawa (CA); James Jianfeng Weng, Kanata (CA); Ying Shao, Kanata (CA); Patrick Lie Chin Cheong, Kanata (CA); Guoqiang Lu, Kanata (CA); Hong Yu, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 181 days.

(21) Appl. No.: 14/437,857

(22) PCT Filed: Mar. 16, 2015

(86) PCT No.: PCT/IB2015/051921
§ 371 (c)(1),
(2) Date: Apr. 23, 2015

(87) PCT Pub. No.: WO2016/147030
PCT Pub. Date: Sep. 22, 2016

(65) Prior Publication Data
US 2016/0277172 A1 Sep. 22, 2016

(51) Int. Cl.
*H04L 5/00* (2006.01)
*H04W 24/02* (2009.01)
(Continued)

(52) U.S. Cl.
CPC .......... *H04L 5/0098* (2013.01); *H04L 5/0055* (2013.01); *H04W 24/02* (2013.01); *H04W 72/085* (2013.01); *H04W 72/044* (2013.01)

(58) Field of Classification Search
None
See application file for complete search history.

(56) References Cited

U.S. PATENT DOCUMENTS

| 2011/0026422 A1 | 3/2011 | Ma et al. |
| 2015/0117321 A1 | 4/2015 | Chen et al. |
| 2015/0124709 A1 | 5/2015 | Ren et al. |

FOREIGN PATENT DOCUMENTS

| EP | 2775758 A1 * | 9/2014 | ............ H04W 28/16 |
| EP | 2775758 A1 | 9/2014 | |

(Continued)

OTHER PUBLICATIONS

3GPP TS 36.213, E-UTRA Physical layer procedures, v10.9.0.
PCTIB2015051921—PCT International Search Report.

*Primary Examiner* — Charles C Jiang
*Assistant Examiner* — George Atkins, Jr.
(74) *Attorney, Agent, or Firm* — Withrow & Terranova, PLLC

(57) ABSTRACT

In one embodiment, a method of operating a radio access node is provided. The method comprises determining whether support from a secondary cell is required for a wireless device to communicate with the radio access node, and, in response to determining that support from the secondary cell is required, calculating a modified channel condition outer-loop value for the secondary cell; and using the modified channel condition outer-loop value in an initial activation decision step for the secondary cell. The initial activation decision step may comprise activating the secondary cell in response to determining that the sum of a device reported channel condition value and the modified (Continued)

channel condition outer-loop value is above an activation threshold. Corresponding devices, computer programs and radio access nodes adapted to carry out the methods provided are also disclosed.

13 Claims, 6 Drawing Sheets

(51) Int. Cl.
  *H04W 72/08* (2009.01)
  *H04W 72/04* (2009.01)

(56) References Cited

FOREIGN PATENT DOCUMENTS

| EP | EP2775748 A1 | * | 9/2014 | | |
|---|---|---|---|---|---|
| WO | 2014205644 A1 | | 12/2014 | | |
| WO | WO-201405644 A1 | * | 12/2014 | ............... | H04L 1/00 |
| WO | WO-2014205644 A1 | * | 12/2014 | ............... | H04L 1/00 |

* cited by examiner

SECONDARY CELL ACTIVATION/DEACTIVATION IN CARRIER AGGREGATION

TECHNICAL FIELD

The present disclosure relates to secondary cell activation/deactivation in carrier aggregation and in particular to using outer-loop values in secondary cell activation/deactivation in carrier aggregation.

BACKGROUND

Carrier aggregation (CA) is an important feature for bandwidth expansion and throughput increase in wireless communications technologies such as those governed by 3GPP (3rd Generation Partnership Program) LTE (Long Term Evolution) and LTE-advanced standards. CA has been developed to meet growing capacity demands due to rapid growth of wireless data services.

In CA, more than one carrier is employed simultaneously to carry information between CA capable wireless devices and radio access nodes. Wireless devices are also referred herein as user equipment devices (UEs) while radio access nodes may be referred herein as base stations, evolved or enhanced Node B's (eNB's), remote radio units (RRUs) etc. CA introduces the concepts of Primary cell (PCell) and Secondary cells (SCells). The PCell and SCell are UE specific. The PCell for a UE is the cell that the UE selects to camp on. By design, a PCell stays activated all the time, handling the radio resource control (RRC) connection establishment, re-establishment, or handover. If a UE is CA capable, one or more SCells can be allocated to a session for the UE, such as via RRC messages. The SCell of a UE can be in an activated or a deactivated state. In LTE, SCell activation/deactivation commands are sent to a UE via the medium access control (MAC) layer. An SCell can carry data only after the SCell activation.

A carrier-aggregation capable LTE UE needs to monitor the control channels (such as Physical Downlink Control Channels (PDCCH)) and the Common Reference Signal (CRS) for activated SCells, in addition to monitoring a control channel for the PCell, in each downlink sub-frame for possible DL data transmissions. These monitoring activities consume the UE's battery power. Therefore, from a UE power saving perspective, it is important that an SCell for the UE is deactivated as soon as new data request for the UE is low or whenever new data request can be handled fully by the PCell.

Apart from considering the UE new data request, a radio access node also needs to consider how to perform link adaptation (LA) to more effectively use radio resources. One strategy is to deactivate a UE's SCell when the UE is in a bad radio frequency (RF) condition. The radio access node may determine a UE's RF condition by a combination of UE's channel condition reports, such as channel quality information (CQI) or channel state information (CSI) reports, and an outer-loop adjustment value from an outer-loop link adaptation (OLA) algorithm. Often, the outer-loop adjustment value is a signal-to-noise ratio (SNR) correction factor (SNR_OLA), proposed as an adjustment factor for a better SNR estimation, as channel condition reports such as CQI reports might not be accurate and, for example, might not consider inter-cell interference. Herein, SNR can also represent signal-to-noise-and-interference-ratio (SINR). In LTE downlink (DL) CA for example, for a given UE, link adaptation can be based on a signal-to-noise ratio (SNR) estimate which is the sum of an SNR mapped from downlink CQI and the outer-loop adjustment value. The CQI is determined by the UE and is reported periodically or aperiodically to the radio access node through uplink (UL) channels, such as Physical Uplink Shared Channel (PUSCH) or Physical Uplink Control Channel (PUCCH). A link adaptation processor receives downlink data for a downlink transmission to the mobile terminal scheduled for a particular sub-frame, selects a modulation and coding scheme (MCS) for the downlink transmission based on the SNR estimate, and outputs the downlink transmission with the selected MCS. When the SNR estimate calculated by the radio access node for a UE is very low, the link adaptation will schedule very small data rate for the UE. In this case, it may be better not to schedule SCell data to the UE in order to free up SCell data resources for other UEs. Furthermore, deactivating the SCell in such circumstances would also save the UE's battery power.

FIG. 1 illustrates a cellular communications network 1 representing a current LTE advanced CA scenario. The cellular communications network 1 includes a PCell 3 and at least one SCell 4. There may be more than one SCell, although FIG. 1 shows one as an example. The PCell 3 has associated a PCell coverage area and a PCell radio unit (RU) 5. The SCell 4 has associated an SCell coverage area and an SCell RU 6. RU's 5 and 6 are comprised within one or more radio access nodes (RANs) 7. The PCell and SCell coverage areas are distinct in terms of associated frequency carriers and may or may not be distinct in terms of physical geographical area. The RAN(s) 7 may comprise hardware and/or software components that are physically collocated or distributed at different physical locations. Furthermore, in the case of a plurality of RANs 7, the RANs may be physically collocated or distributed. A UE 2 can receive downlink (DL) signals from both the PCell 3 and the SCell 4. The UE 2 sends uplink (UL) signals only to the PCell 3. In the illustrated scenario, the signals sent back to the PCell from the UE 2 include at least one of:

Downlink (DL) CQI or CSI for PCell 3 and SCell 4; and
HARQ feedbacks for PCell 3 and SCell 4 (to indicate whether or not at least a transport block, i.e., a data portion, is successfully received and decoded).

The feedback information received at PCell 3 for SCell 4 will be passed to SCell 4. A HARQ feedback may be, for example, either a positive HARQ acknowledgement (i.e., a HARQ ACK) or a negative HARQ acknowledgement (i.e., a HARQ NACK).

OLA algorithms are done independently for each UE for PCell 3 and SCell 4. An OLA algorithm can be based, for example, on the HARQ feedback. A HARQ ACK may indicate that the current OLA value needs to be incremented, while a HARQ NACK may indicate that a current OLA value needs to be decremented. The OLA results for a UE are used in the link adaptation along with UE's CQI to determine MCS for maintaining best throughputs based on the radio channel conditions."

In summary, existent schemes for SCell activation/deactivation known to the inventors, consider the following:
New data requests for the UE.
Downlink SNR for the corresponding SCell, based on UE reported CQI (SNR_CQI) and an outer-loop SNR adjustment/offset (SNR_OLA).

In certain scenarios, however, the existent solutions for SCell activation/deactivation have some problems. Some exemplary scenarios are when UEs are moving or when UEs are travelling through high interference zones. In particular, in such scenarios, it has been observed that SCells of UEs are sometimes not able to re-activate and their throughput becomes zero or that SCells of UEs do re-activate, but high decoding errors are encountered at the beginning of the re-activation.

Therefore, there is a need in the art for improved methods and apparatus for SCell activation/deactivation.

SUMMARY

The present application discloses methods and apparatus for improving the secondary cell activation/deactivation in carrier aggregation.

In one embodiment, a method of operating a radio access node is provided. The method comprises determining whether support from a secondary cell is required for a wireless device to communicate with the radio access node, and, in response to determining that support from the secondary cell is required, calculating a modified channel condition outer-loop value for the secondary cell and using the modified channel condition outer-loop value in an initial activation decision step for the secondary cell. The initial activation decision step may comprise activating the secondary cell in response to determining that the sum of a device reported channel condition value and the modified channel condition outer-loop value is above an activation threshold.

In a particular embodiment, calculating the modified channel condition outer-loop value for the secondary cell comprises setting the modified channel condition outer-loop value to be the maximum value between zero and a last known channel condition outer-loop value for the secondary cell. The method may further comprise setting an initial link adaptation channel condition outer-loop value to be the minimum value between zero and the last known channel condition outer-loop value for the secondary cell, and, following activating the secondary cell, using the initial link adaptation channel condition outer-loop value in an initial link adaptation step for the secondary cell.

In another particular embodiment, calculating the modified channel condition outer-loop value for the secondary cell may comprise determining whether a last known channel condition outer-loop value for the secondary cell is negative, and, in response to determining that the last known channel condition outer-loop value is negative, setting the channel condition outer-loop value to be the sum of the last known channel condition outer-loop value and a small predefined positive adjustment constant, or, in response to determining that the last known channel condition outer-loop value is not negative, setting the channel condition outer-loop value to be zero.

The radio access node in the method of any of the preceding embodiments may be a base station or an enhanced Node B.

In a further embodiment, a radio access node is provided. The radio access node comprises circuitry, the circuitry containing instructions which when executed cause the device to perform the method of any of the preceding embodiments. The circuitry may comprise at least one processor and a memory coupled to said processor, the memory containing said instructions.

In a further embodiment, a computer program is provided. The computer program comprising instructions which, when executed on at least one processor, cause the at least one processor to carry out the method according to any of the preceding embodiments. A carrier containing the computer program of is also provided. The carrier may be any one of an electronic signal, an optical signal, a radio signal, or a computer readable storage medium.

In a further embodiment according to the present disclosure, a radio access node comprises means determining whether support from a secondary cell is required for a wireless device to communicate with the radio access node, means for calculating a modified channel condition outer-loop value for the secondary cell in response to determining that support from the secondary cell is required, and means for using the modified channel condition outer-loop value in an initial activation decision step for the secondary cell.

In a further embodiment according to the present disclosure, a radio access node comprises a secondary cell support decision module operative to determine whether support from a secondary cell is required for a wireless device to communicate with the secondary cell radio access node, a modified outer loop calculation module operative to calculate a modified channel condition outer-loop value for the secondary cell in response to determining that support from the secondary cell is required, and a secondary cell activation module operative to use the modified channel condition outer-loop value in an initial activation decision step for the secondary cell.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods relating to secondary cell activation/deactivation in carrier aggregation within a cellular communications network are disclosed. In the embodiments described below, the cellular communications network is a 3$^{rd}$ Generation Partnership Project (3GPP) Long Term Evolution (LTE) network and, as such, LTE terminology is sometimes used. Note, however, that the embodiments disclosed herein may be applicable to other types of cellular communications networks. Moreover, CQI is often used to refer to one type of channel condition information, however, other channel condition information, including CSI, could be used, independently or in combination.

As mentioned earlier, some existent schemes for SCell activation/deactivation of a UE may consider a new data request for a CA capable UE and the downlink SNR for a corresponding SCell, where the downlink SNR is estimated as the sum of SNR_CQI and SNR_OLA.

Figure 2:
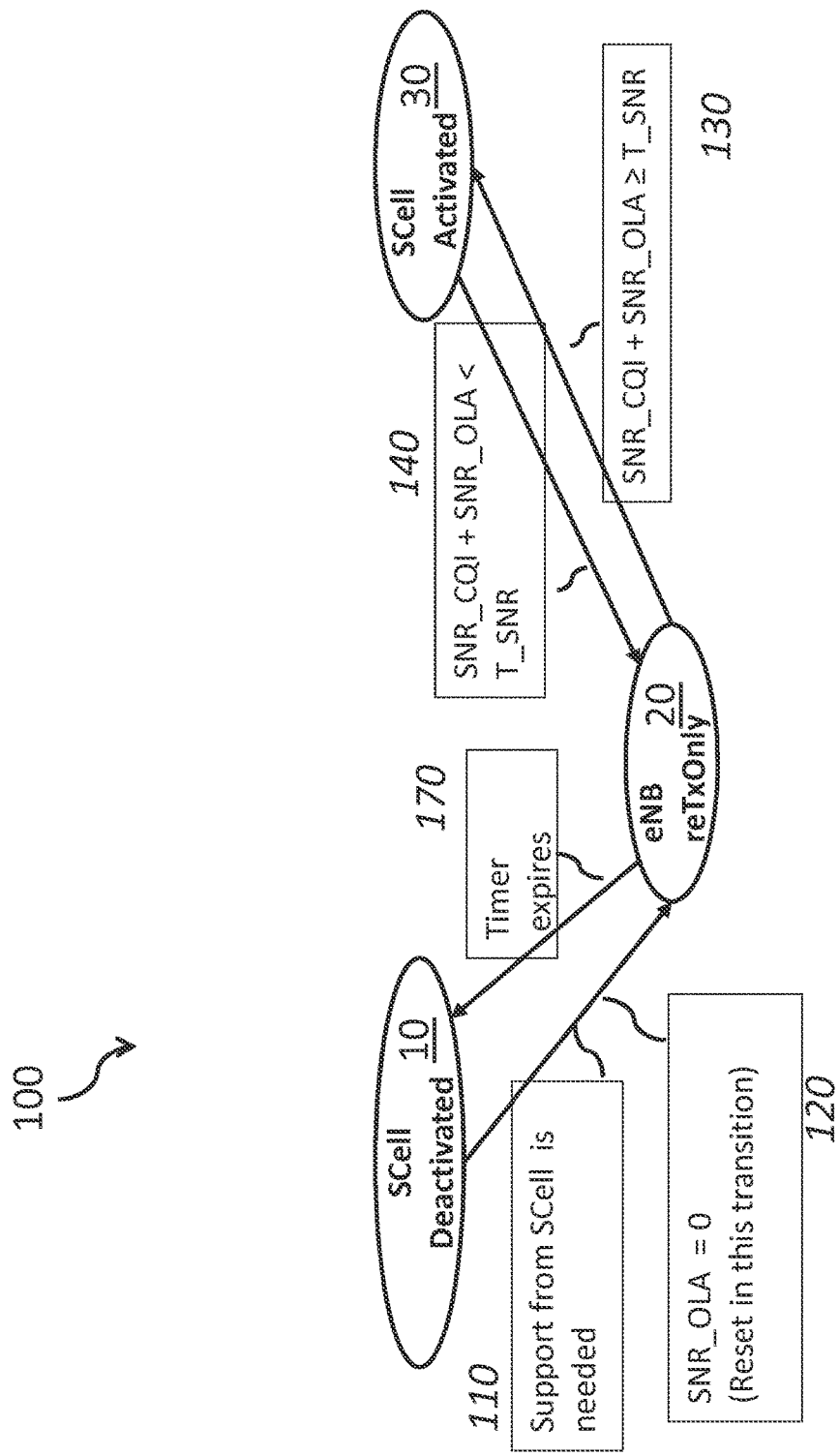
FIG. 2 illustrates a state diagram for a conventional scheme for SCell activation/deactivation.

A state diagram for an existent SCell activation/deactivation scheme for LTE is illustrated in FIG. 2. According to this scheme, the SCell can be in one of three states: an SCell deactivated state 10, a retransmission only (reTX) state 20 and an SCell activated state 30. States 10, 20, 30 correspond to eNB internal states. Furthermore, state 10 corresponds to a UE SCell deactivated state and states 20 and 30 correspond to UE's SCell activated state. Some delay may exist between transitions to the UE SCell states and the eNB SCell states. If the SCell stale is in the deactivated state 10, a new data request indicating support of an SCell is needed will start an activation of the SCell process, moving the SCell to the retransmission only state 20 and a timer will be started (step 110). Here, for UE in an SCell deactivated state, the support of an SCell means activation of the SCell is needed. In the retransmission only state 20, at least one CQI report from the UE is requested. In this scheme, it is assumed that the at least one UE's CQI report is inaccurate and the UE's actual RF condition is reflected by the sum of SNR_CQI and SNR_OLA. A determination whether the sum of SNR_CQI and SNR_OLA is larger than an SNR threshold (T_SNR) is made. If the sum of SNR_CQI and SNR_OLA is larger than T_SNR, the SCell will move to the SCell activated state 30 (step 130) and will be used for new DL data transmission.

While the SCell is in the activated state 30, if the sum of SNR_CQI and SNR_OLA of the UE for the SCell becomes less than the SNR threshold (T_SNR), the SCell transitions back to the retransmission only state 20 (step 140). While in the retransmission only state 20, if the sum of SNR_CQI and SNR_OLA of a UE for the SCell continues to be less than the SNR threshold (T_SNR) for a given period time, i.e. until the timer expires, the SCell moves to the deactivated state 10 (step 170). In the meantime, the UE will be notified of the move of the SCell to the deactivated state 10. This may be done by sending via PCell a MAC Control Element (CE) command to the UE.

In this scheme, it is assumed that when the UE transitions from the SCell activated state 30 to the SCell deactivated state 10, the outer loop link adaptation algorithm has converged. In other words, the SNR_OLA is a good correction value for the channel condition when the SCell leaves the activated state 30. However, when new data arrive and the data buffer size for the UE warrants starting the activation process of the SCell from the deactivated state 10, a new CQI update is requested from the UE. A problem arises in initializing SNR_OLA when the SCell has been deactivated for a while and the channel conditions that affected the SNR_OLA may or may not have changed. There are two possibilities to initialize SNR_OLA:

Reset SNR_OLA to 0 (shown in FIG. 2 as step 120) or
Use the old converged SNR_OLA value (denoted herein as SNR_OLA_old) (alternative to step 120)

However, using the sum of SNR_CQI and SNR_OLA for new data scheduling decision on SCell and for the subsequent link adaptation (LA) once new data is scheduled on the SCell, with SNR_OLA selected as in either one of the above two approaches, leads to problems in certain scenarios.

The reset of SNR_OLA to zero in step 120 causes a problem of having many initial NACKs since any previously accumulated SNR_OLA history is lost. Furthermore, if the SCell corresponding to a UE session was previously activated and its deactivated period was short, it might not be good to start from a zero SNR_OLA as the downlink channel condition affecting CQI estimation may not have been changed. In particular:

In a Cell Specific Reference Symbol (CRS) shifted deployment, a CRS spectrum position of at least one neighbor cell may be different from the CRS spectrum positions of a serving SCell. For a UE in an activated SCell, if the at least one neighboring cell is lightly loaded, the at least one neighbor cell's CRS spectrum position will only interfere with the activated SCell's data Resource Element (RE) but not the activated SCell's CRS REs. As a result, the channel SNR of the activated SCell of the UE estimated based on CRS will be higher than that of the PDSCH, i.e., the UE may over-estimate the CQI and report that back to the eNB. If the eNB LA assigns DL data according to the UE reported CQI, there may be a lot of NACKs initially. The eNB outer-loop can eventually converge to a negative SNR_OLA to reach a target Bock Error Rate (BLER).

In subsequent activations of the SCell, if the loading condition on the at least one neighbor cell has not changed, the UE again will over-estimate the CQI. If the SNR_OLA is reset to 0, it means that the eNB will again schedule for the UE based on the over-estimated SNR_CQI, resulting in a lot of initial NACKs.

Initializing the outer-loop adjustment value to an old converged SNR_OLA, may also cause problems. For example, the old converged SNR_OLA could be a negative value at the time when the SCell was deactivated as the sum of SNR_CQI and SNR_OLA was less than an SCell deactivation threshold. Although the channel may have changed since then, in some cases, when there is no higher CQI update from the UE, the sum of SNR_CQI and the old SNR_OLA is still less than the SCell deactivation threshold and as such the UE may stay in deactivated state for a long time as it never gets a chance to update its SNR_OLA.

Problems that may arise in the two SNR_OLA initialization scenarios are further described in Tables 1 and 2 for the cases of over-estimated CQI (negative outer-loop adjustment) and under-estimated CQI (positive outer-loop adjustment), respectively. In Tables 1 and 2:

SNR_OLA_old: refers to a converged outer-loop adjustment SNR from a previous SCell activated state of a UE;

SNR_CQI new: refers to an initial UE measured SNR when the UE reaches activated state 30 from deactivated state 10, but there is no new data scheduled on the SCell yet;

SNR_OLA_new: refers to a newly converged outer-loop adjustment value after the UE has been activated and started carrying new data on the SCell.

SNR_actual: refers to an actual SNR, which could be different from the SNR mapped from the UE reported CQI.

TABLE 1

| Over-estimated CQI (SNR_CQI > SNR_actual, SNR_OLA_old < 0) | | |
|---|---|---|
| Conditions affecting SNR_OLA | Initialize SNR_OLA_new to 0 | Initialize SNR_OLA_new to SNR_OLA_old |
| SCell RF condition above T_SNR but conditions affecting SNR_OLA have not changed: SNR_OLA_old < 0 SNR_OLA_new < 0 SNR_CQI_new + SNR_OLA_old > T_SNR | A lot of NACKs before outer-loop converges as SNR_CQI_new > SNR_actual | No adverse effect |
| SCell RF condition above T_SNR but conditions affecting SNR_OLA have changed: SNR_actual > T_SNR, (This means SCell should be activated) SNR_OLA_old < 0 SNR_OLA_new > SNR_OLA_old SNR_CQI_new > T_SNR SNR_CQI_new + SNR_OLA_old < T_SNR | No adverse effect | No new data will be scheduled on SCell unless SNR_CQI_new + SNR_OLA_old is larger than T_SNR. In other words, SNR_CQI_new needs to be high enough to overcome the negative impact of SNR_OLA_old. |

TABLE 2

| Under-estimated CQI (SNR_CQI < SNR_actual, SNR_OLA_old > 0) | | |
|---|---|---|
| Conditions affecting SNR_OLA | Reset OLA: initialize SNR_OLA_new to 0 | Initialize SNR_OLA_new to SNR_OLA_old |
| SCell RF condition above T_SNR but conditions affecting SNR_OLA have not changed: SNR_OLA_old > 0 SNR_OLA_new > 0 SNR_CQI_new < T_SNR SNR_CQI_new + SNR_OLA_old > T_SNR | No new data will be scheduled on SCell as when SNR_OLA_new = 0, the sum of SNR_CQI_new and SNR_OLA_new will be less than T_SNR. The SCell will not be activated. | No adverse effect |
| SCell RF condition above T_SNR but conditions affecting SNR_OLA have changed: SNR_OLA_old > 0 SNR_OLA_new <SNR_OLA_OLD SNR_CQI_new > T_SNR SNR_CQI_new + SNR_OLA_old > T_SNR | No adverse effect | A lot of NACKs before outerloop converges as SNR_CQI_new + SNR_OLA_old is larger than the real SNR which is the sum of SNR_CQI_new and SNR_OLA_new. Here, SNR_OLA_new is assumed to be negative. |

To address the aforementioned problems, the present disclosure proposes methods and devices in which SCell activation is performed based on a modified channel condition outer-loop value. With regards to specific embodiments, the modified channel condition outer loop value will be referred herein as mod_SNR_OLA.

Figure 3:
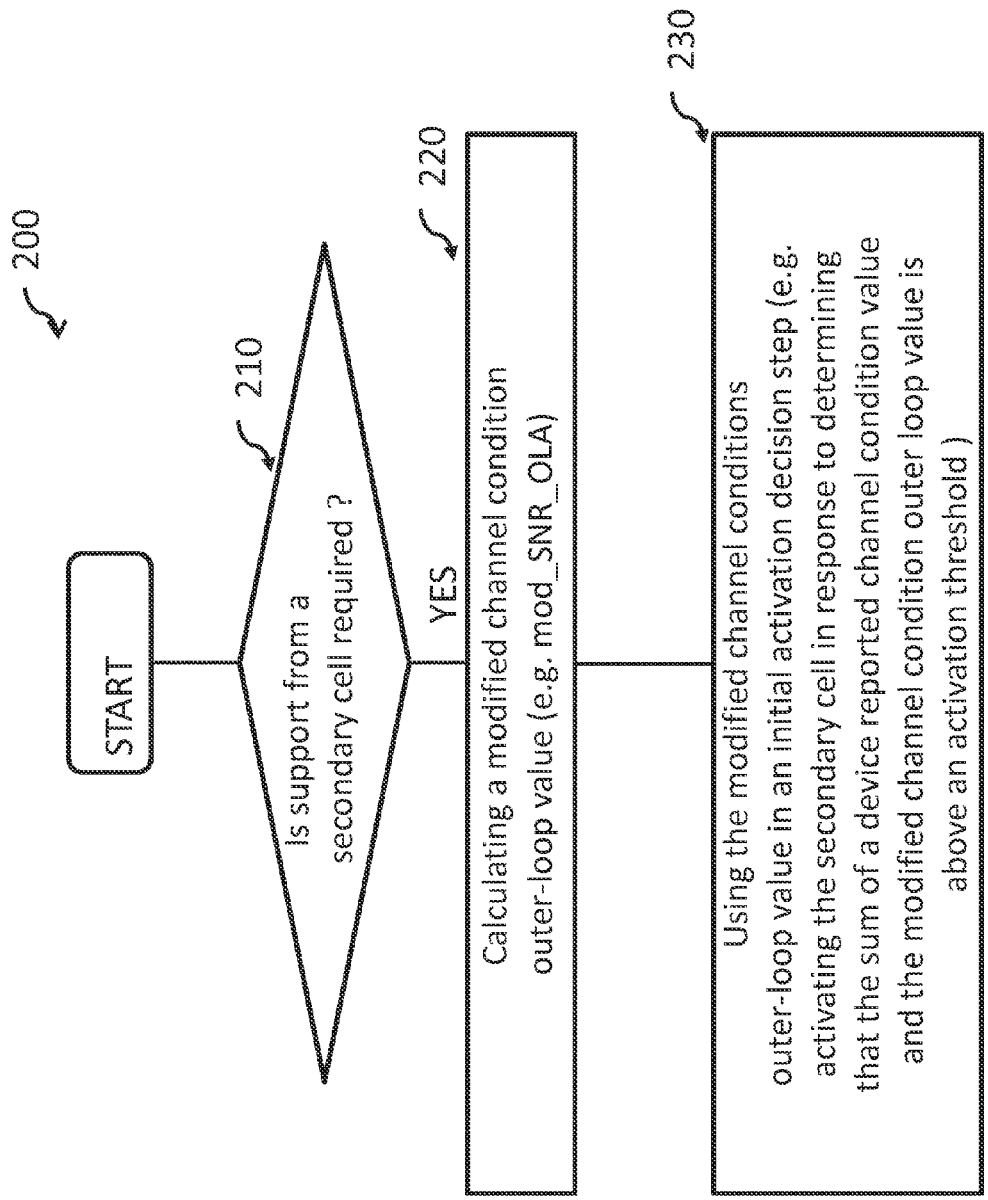
FIG. 3 illustrates a flow-chart of a method for SCell activation/deactivation according to some embodiments of the present disclosure.

FIG. 3 illustrates a method (200) of operating a radio access node according to one embodiment of the disclosure. The method comprises determining (210) whether support from a secondary cell is required for a wireless device. In response to determining that support from the secondary cell is required, a modified channel condition outer-loop value for the secondary cell is calculated (220) and, the modified channel condition outer-loop value is used in an initial activation decision step for the secondary cell (230). In one embodiment, the initial activation decision step comprises activating the secondary cell in response to determining that the sum of a device reported channel condition value and the modified channel condition outer-loop value is above an activation threshold. The modified channel condition outer-loop value can be calculated in various ways.

Figure 4:
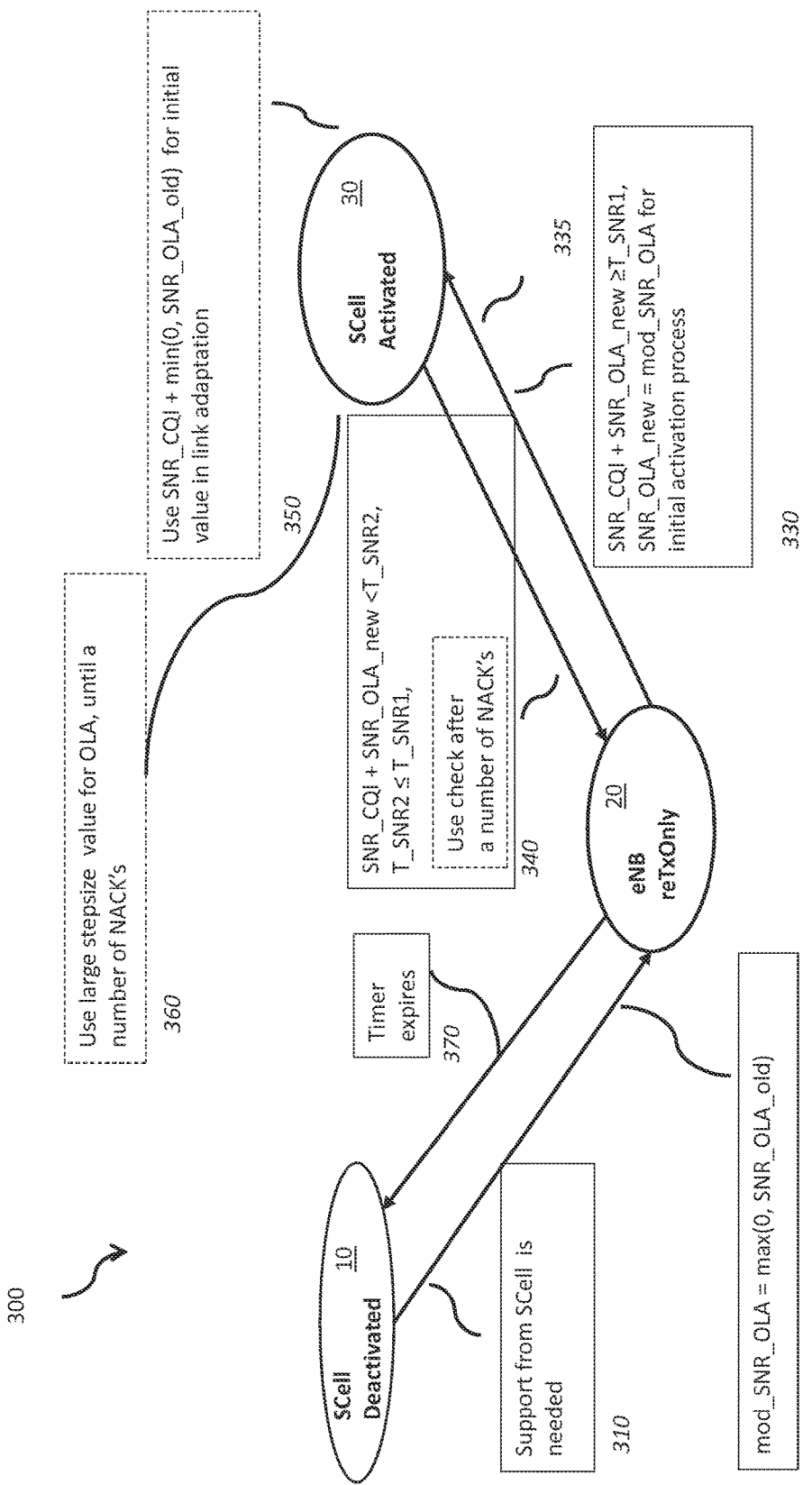
FIG. 4 illustrates a state diagram for methods for SCell activation/deactivation according to some embodiments of the present disclosure.
Figure 5:
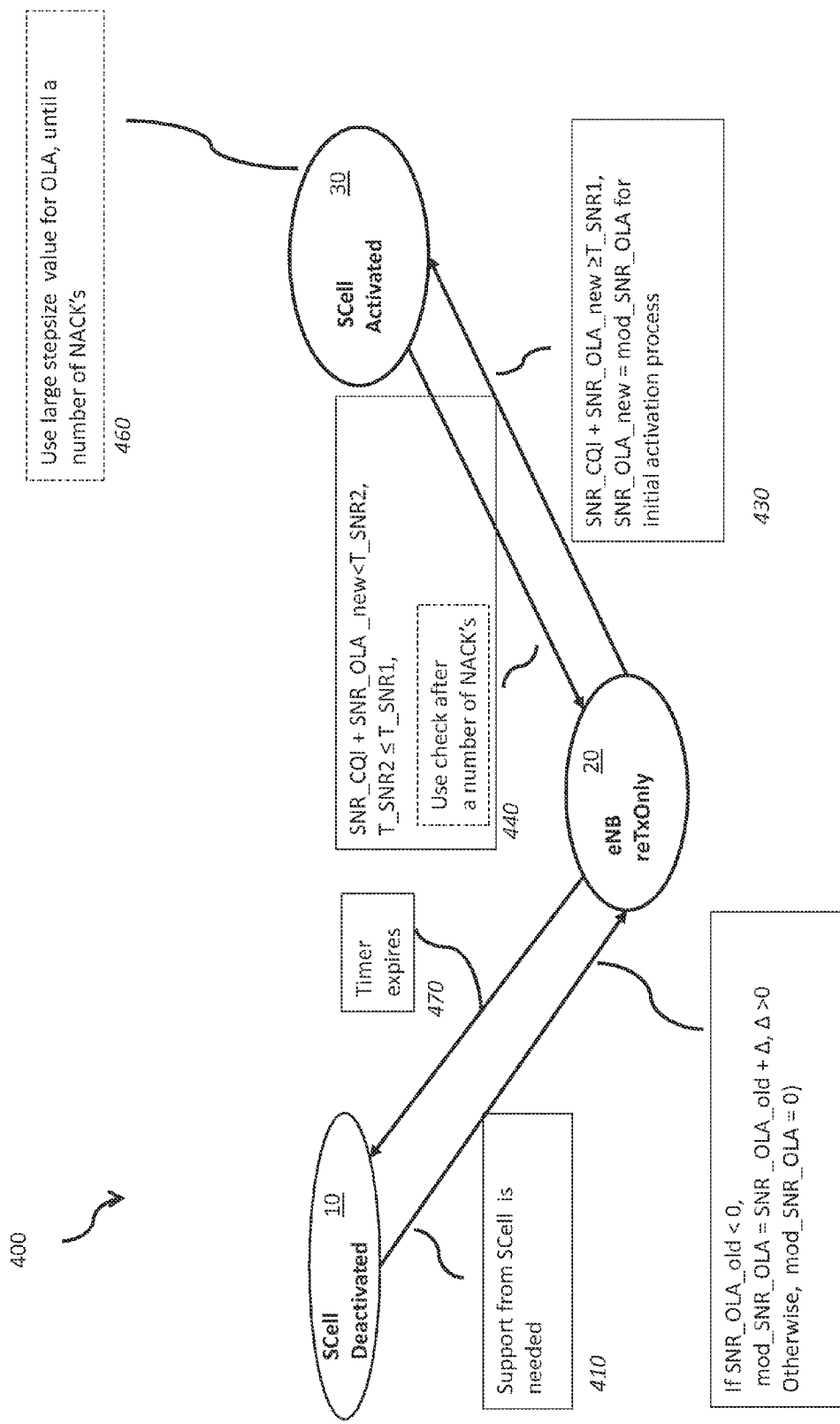
FIG. 5 illustrates a state diagram for methods for SCell activation/deactivation according to some embodiments of the present disclosure.

FIGS. 4 and 5 illustrate respectively two state diagrams corresponding to methods (300) and (400) for SCell activation/deactivation according to some embodiments of the present disclosure. Methods 300 and 400 differ in the step of calculating the modified channel condition outer-loop value. FIGS. 4 and 5 refer to an LTE setting and to SNR as the parameter used to measure channel conditions, however it will be understood that the concepts described are applicable to other cellular communication settings and other parameters that can indicate the channel conditions. As in FIG. 2, the SCell can be in one of the SCell deactivated state 10, the retransmission only (reTX) state 20 and the SCell activated state 30. If a UE's SCell state is in the deactivated state 10, a new data request indicating support of the SCell is needed will start an activation of the SCell process, moving the SCell to the retransmission only state 20 (step 310). However, steps (320) and (420) in the embodiments according to FIGS. 4 and 5 are distinct from step 120 in FIG. 2. In particular, in step 320 in the embodiments according to FIG. 4, a modified channel condition outer-loop value for the SCell is calculated by setting the modified channel condition outer-loop value as the maximum value between zero and a last known channel condition outer-loop value for the secondary cell (e.g. mod_SNR_OLA=max(0, SNR_OLA_old). The last known channel condition outer-loop value is referred herein as SNR_OLA_old. In particular, in step 420 in the embodiments according to FIG. 5, calculating the modified channel condition outer-loop value for the secondary cell comprises: determining whether a last known channel condition outer-loop value for the secondary cell is negative, and, in response to determining that the last known channel condition outer-loop value is negative, setting the channel condition outer-loop value to be the sum of the last known channel condition outer-loop value and a predefined positive adjustment constant $\Delta$, $\Delta>0$, (e. g. mod_SNR_OLA=SNR_OLA_old+$\Delta$, and SNR_OLA_old=mod_SNR_OLA) or, in response to determining that the last known channel condition outer-loop value is not negative, setting the channel condition outer-loop value to 0. In further embodiments, setting the channel condition outer-loop value to be the sum of the last known channel condition outer-loop value and a predefined positive adjustment constant $\Delta$, $\Delta>0$, (e. g. mod_SNR_OLA=SNR_OLA_old+$\Delta$) in response to determining that the last known channel condition outer-loop value is negative, is followed by setting the last known channel condition outer-loop value to be the channel condition outer-loop value SNR_OLA_old=mod_SNR_OLA.

In the retransmission only state 20, checks whether conditions for activation are met are performed, i.e. activation decision steps are performed. In particular, information about the RF channel conditions is requested from the UE and a determination whether the sum of the device reported channel condition value and the updated channel condition outer-loop value (SNR_OLA_new) is above the activation threshold (T_SNR1) is performed (e.g. periodically, aperiodically, upon receiving new CQI report etc.). At least in the first transition from the retransmission only state 20 to the activated state 30 after the SCell has been deactivated, the updated channel condition outer loop value (SNR_OLA_new) is the modified channel conditions outer loop value (mod_SNR_OLA) set in the transition from the deactivated state 10 to the retransmission only state 20 (i.e. SNR_OLA_new=mod_SNR_OLA for initial transition in activation process). Thus, in an initial activation decision step, the updated channel condition outer loop value is the modified channel conditions outer loop value. If activation conditions are not met for a period of time, e.g. until a timer expires, the SCell transitions from the retransmission only state 20 back to the deactivated state 10 (steps 370, 470). In response to determining that the sum of device reported channel condition value and the updated channel condition outer-loop value is larger than the activation threshold (SNR_CQI+SNR_OLA_new≥T_SNR1), the SCell moves to the SCell activated state 30 (step 330, 430) and can be used for new DL data transmission.

The methods according to any one of FIGS. 3-5, may further comprise a deactivation decision step (e.g. steps 340, 440 in FIGS. 4 and 5, respectively). According to FIGS. 4 and 5, the deactivation decision step (340, 440) comprises maintaining the secondary cell in the activated state 30 in response to determining that the sum of a device reported channel condition value and an updated channel condition outer-loop value (e.g. SNR_CQI+SNR_OLA_new) is above a deactivation threshold (e.g.T_SNR2), and deactivating the secondary cell in response to determining that the sum of a device reported channel condition value and the updated channel condition outer-loop value is below the deactivation threshold. Preferably, the deactivation threshold (T_SNR2) is below the activation threshold (T_SNR1), for hysteresis control.

As in FIG. 2, in the embodiments of FIGS. 4 and 5, the deactivation from the activated state 30 is first to the retransmission only state 20 and, as noted earlier, in the retransmission only state 20, checks whether conditions for activation are met may again be performed. In alternate embodiments (not shown) an SCell may transition directly from an activated state (such as state 30) to a deactivated state (such as state 10).

Optionally, in the embodiments in FIGS. 4 and 5, when first entering the activated state 30, a large stepsize (e.g. an up_step) is used for the outer-loop adjustment algorithm (OLA). The large stepsize is used in a set of initial iterations of OLA, e.g. to adjust the OLA up when receiving an ACK until a first NACK (or a number of NACK's) is (are) received (steps 360, 460). The choices of the initial step size and of the number of NACKs are design choices, dependent on factors such as desired speed of convergence. The initial large stepsize is subsequently switched to a normal stepsize. This helps OLA converge more quickly when first entering the activated state and allows for fewer iterations. Furthermore, optionally, when first entering the activated state 30, the comparison of the sum of a device reported channel condition value and an updated channel condition outer-loop value with the deactivation SNR threshold (T_SNR2) may be skipped until receiving a number of NACKs. This prevents from deactivating the SCell too quickly, and before OLA has a chance to converge (steps shown as optional substeps in steps 340, 440).

Furthermore, optionally, the method associated with the state diagram illustrated in FIG. 4 further comprises setting an initial link adaptation channel condition outer-loop value to be the minimum value between zero and the last known channel condition outer-loop value for the SCell (e.g. min (0,SNR_OLA_old) and using the initial link adaptation channel condition outer-loop value in an initial link adaptation step for the SCell (step 350).

Thus, when optional step 350 is included, separate initial SNR_OLA values are used for SCell activation decision and for initial link adaptation. This allows to use an aggressive SNR_OLA initial value for the SCell activation decision, but use a conservative SNR_OLA initial value for the link adaptation, i.e., For new data scheduling decision, use SNR_CQI+max(0, SNR_OLA_old) to compare against T_SNR1; and For new data link adaptation on SCell, use SNR_CQI+ min(0,SNR_OLA_old)

Compared to the method associated with FIG. 4 and including optional step 350, the method associated with FIG. 5 advantageously allows maintaining the history of SNR_OLA for link adaptation for avoiding lot of NACKs right after SCell activation and yet the positive $\Delta$ can help activate the SCell. However, in scenarios where the SCell needs to be activated when there is new data request and when SNR based on UE reported CQI is larger than a threshold, the method associated with FIG. 5 may not accommodate the new data request as quickly as the methods associated with FIG. 4, as a UE with a negative SNR_OLA may wait for a shorter time to get its SCell activated as compared with a UE with a larger negative SNR_OLA. That is fair in the sense that a UE with a poorer SNR performance gets less chance of SCell activation. Consequently, each method has its advantages and can be chosen depending on design preferences. Furthermore, various combinations of the various steps in the two methods described can be implemented in further embodiments.

Various timers and timing mechanism can be implementing in conjunctions with transitions among the various SCell states, such as those illustrated in FIGS. 4 and 5, to allow for timed transitions between states according to desired design parameters. In particular, in the embodiments associated with FIGS. 4 and 5, a timer can be started in the transition from the deactivated state 10 and then restarted every time one or more particular activation conditions are met, such as every time the sum of the device reported channel condition value and the updated channel condition outer-loop value (SNR_OLA_new) is above the activation threshold (T_SNR1) (i.e. SNR_CQI+SNR_OLA_new ≥T_SNR1). A check regarding the one or more activation conditions can be performed in the retransmission only state 20 (leading to a transition to the activated state 30, upon a positive response to the check) or in the activated state 30 (leading to remaining in the activated state 30, upon a positive response to the check). Alternatively, a timer can be started in the transition from the deactivated state 10 to the retransmission state 20 and then restarted every time a deactivation condition is met in the activated state 30, such as every time the sum of the device reported channel condition value and the updated channel condition outer-loop value (SNR_OLA_new) is less than the deactivation threshold (T_SNR2)(i.e. SNR_CQI+SNR_OLA_new ≤T_SNR2). Other possible timing mechanisms may be implemented.

In summary, the present disclosure proposes outer-loop adjustment solutions for SCell activation/deactivation. Some of the proposed embodiments aim to address the initial NACK problems associated with the outer-loop adjustment resetting to zero approach or using the last known outer-loop adjustment approach. In one proposed embodiment, such as presented in connection with FIG. 4, SNR_OLA is initialized to different values for new data scheduling decision and for subsequent LA. In another proposed solution, such as presented in connection with FIG. 5, a positive constant (Δ) is added to SNR_OLA in each SCell evaluation for the SCell activation. Some proposed solutions may help retain partial outer-loop adjustment history when a UE's SCell is reactivated and/or address problems such as NACKs from initial transmissions or SCell staying deactivated.

Although the present disclosure describes outer-loop adjustment solutions for downlink carrier aggregation, the proposed embodiments on outer-loop adjustment are also applicable to uplink carrier aggregation.

Tables 3 and 4 summarize differences between the conventional SCell activation/deactivation approaches discussed in connection with Tables 1 and 2 and the SCell activation/deactivation method associated with FIG. 4, when including optional step 350.

TABLE 3

UE over-estimating CQI

| Conditions Affecting UE estimation of CQI | Reset SNR_OLA to 0 | Use SNR_OLA_old | Solution according to FIG. 4, including steps 350, 360 |
|---|---|---|---|
| Unchanged in 2$^{nd}$ activation | A lot of initial NACKs | No adverse impact | Earlier activation, but avoids large number of NACK's |
| Changed in 2$^{nd}$ activation | No adverse impact | No new data will be scheduled on SCell. | Conservative on initial LA, but this can be mitigated by larger initial outer-loop steps (optional step 360) |

TABLE 4

UE under-estimating CQI

| Conditions Affecting UE estimation of CQI | Reset SNR_OLA to 0 | Use SNR_OLA_old | Solution according to FIG. 4, including steps 350 |
|---|---|---|---|
| Unchanged in 2$^{nd}$ activation | No new data will be scheduled on SCell. | No adverse impact | Conservative on initial LA, but this can be mitigated by larger initial outer-loop steps (optional step 360) |
| Changed in 2$^{nd}$ activation | No adverse impact | A lot of initial NACK's | Earlier activation, but avoids large number of NACK's |

Figure 1:
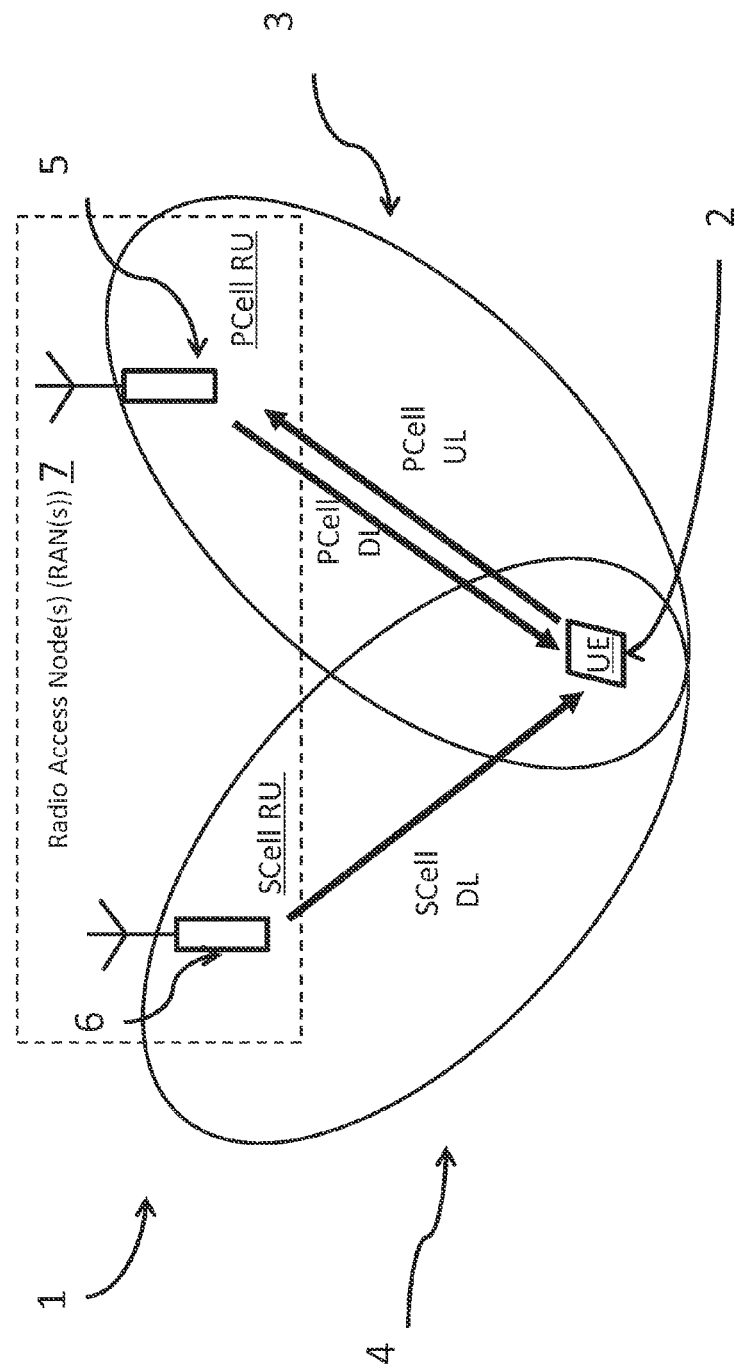
FIG. 1 illustrates a carrier aggregation scenario in a cellular communication network.
Figures 6, 7:
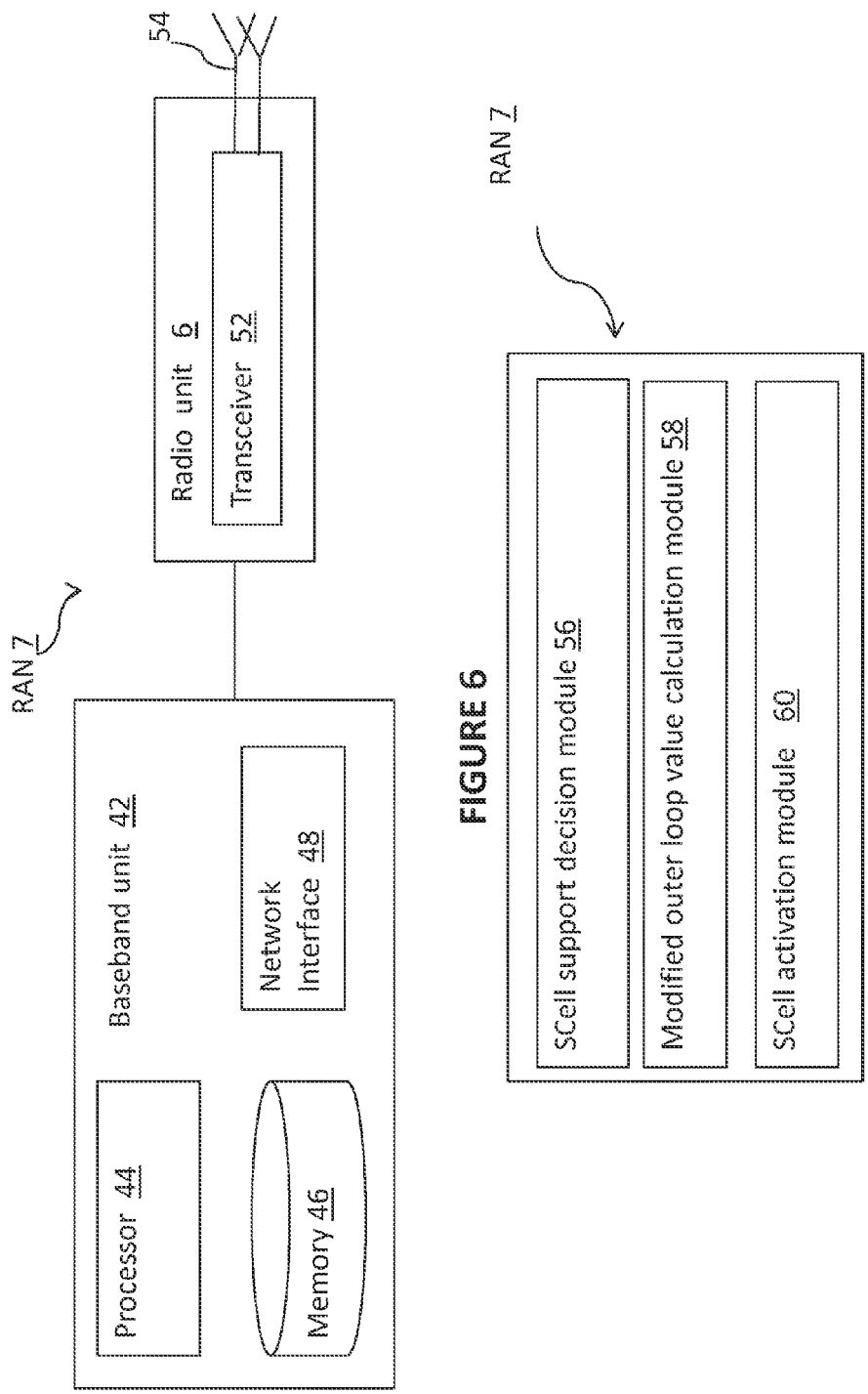
FIG. 6 illustrates a block diagram of a radio access node according to some embodiments of the present disclosure.
FIG. 7 illustrates a block diagram of a radio access node for SCell activation/deactivation according to some embodiments of the present disclosure.

FIG. 6 is a block diagram of an embodiment of a radio access node (RAN) 7 comprising SCell radio unit (RU) 6 in FIG. 1 according to one embodiment of the present disclosure. As illustrated, the RAN 7 comprises circuitry. The circuitry contains instructions which when executed cause the RAN 7 to operate according to any of the embodiments described above. The circuitry comprises a baseband unit 42 including at least one processor 44, memory 46, and a network interface 48, and the radio unit 6 including a wireless transceiver 52 coupled to one or more antennas 54. In general, the RAN 7 operates according to any of the embodiments described above. In one embodiment, the functionality of the RAN 7 discussed above is implemented in software stored in the memory 46 that is executable by the processor 44 whereby the RAN 7 operates according to any of the embodiments described above.

FIG. 7 is another block diagram of an embodiment of the radio access node (RAN) 7 comprising SCell radio unit 6 of FIG. 1 according to another embodiment of the present disclosure. Again, note that this description is more generally applicable to any radio access node. As illustrated, the RAN 7 includes an SCell support decision module 56, a modified outer loop value calculation module 58 and an SCell activation module 60, each of which is implemented in software that is executable by a processor to cause the RAN 7 to operate according to any of the embodiments described above. In general, the support decision module 56 operates to determine whether support from an SCell is required for a wireless device to communicate with the RAN 7. The modified outer loop value calculation module 58 then operates to calculate a modified channel condition outer-loop value for the secondary cell, as described above. The SCell activation module 60 operates to use a calculated modified channel condition outer-loop value in an initial activation decision step, as described above.

In one embodiment, a computer program including instructions which, when executed by at least one processor, causes the at least one processor to carry out the functionality of the RAN 7 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 46).

Other embodiments of the present disclosure comprise:

Embodiment 1. A method of operating a radio access node comprising:
determining whether support from a secondary cell is required for a wireless device to communicate with the radio access node; and
in response to determining that support from the secondary cell is required, calculating a modified channel condition outer-loop value for the secondary cell; and
using the modified channel condition outer-loop value in an initial activation decision step for the secondary cell.

Embodiment 2. The method of embodiment 1, wherein the initial activation decision step comprises activating the secondary cell in response to determining that the sum of a device reported channel condition value and the modified channel condition outer-loop value is above an activation threshold.

Embodiment 3. The method of embodiment 1 wherein calculating the modified channel condition outer-loop value for the secondary cell comprises setting the modified channel condition outer-loop value to be the maximum value between zero and a last known channel condition outer-loop value for the secondary cell.

Embodiment 4. The method of embodiment 2 further comprising:
setting an initial link adaptation channel condition outer-loop value to be the minimum value between zero and the last known channel condition outer-loop value for the secondary cell; and
following activating the secondary cell, using the initial ink adaptation channel condition outer-loop value in an initial link adaptation step for the secondary cell.

Embodiment 5. The method of embodiment 1 wherein calculating the modified channel condition outer-loop value for the secondary cell comprises:
determining whether a last known channel condition outer-loop value for the secondary cell is negative; and
in response to determining that the last known channel condition outer-loop value is negative, setting the channel condition outer-loop value to be the sum of the last known channel condition outer-loop value and a small predefined positive adjustment constant; or
in response to determining that the last known channel condition outer-loop value is not negative, setting the channel condition outer-loop value to be zero.

Embodiment 6. The method of embodiment 1 wherein calculating the modified channel condition outer-loop value for the secondary cell comprises
determining whether a last known channel condition outer-loop value for the secondary cell is negative; and
in response to determining that the last known channel condition outer-loop value is negative, setting the channel condition outer-loop value to be the sum of the last known channel condition outer-loop value and a small predefined positive adjustment constant; and
in response to determining that the last known channel condition outer-loop value is not negative, setting the channel condition outer-loop value to be the maximum value between zero and the last known channel condition outer-loop value.

Embodiment 7. The method of embodiment 2, further comprising a deactivation decision step, the deactivation decision step comprising:
maintaining the secondary cell remains in the active state in response to determining that the sum of a device reported channel condition value and an updated channel condition outer-loop value is above a deactivation threshold below the activation threshold; and
deactivating the secondary cell in response to determining that the sum of a device reported channel condition value and the updated channel condition outer-loop value is below the deactivation threshold Embodiment 8. The method of embodiment 7, wherein the deactivation decision step is performed subsequent to receiving a first negative acknowledgement (NACK) signal.

Embodiment 9. The method of embodiment 2 wherein activating the secondary cell comprises using a large stepsize in a set of initial iterations of an outer-loop adjustment algorithm (OLA).

Embodiment 10. The method of any of the preceding embodiments wherein the radio access node is a base station.

Embodiment 11. A radio access node comprising circuitry, the circuitry containing instructions which when executed cause the device to:
determine whether support from a secondary cell is required for a wireless device to communicate with the radio access node; and
in response to determining that support from the secondary cell is required, calculate a modified channel condition outer-loop value for the secondary cell; and
use the modified channel condition outer-loop value in an initial activation decision step for the secondary cell.

Embodiment 12. The radio access node of embodiment 11 adapted to perform the method of any of embodiments 1-10.

Embodiment 13. The radio access node of embodiment 11, wherein said circuitry comprises at least one processor and a memory coupled to the processor, the memory containing said instructions.

Embodiment 14. A computer program comprising instructions which, when executed on at least one processor (44), cause the at least one processor (44) to carry out the method according to any one of embodiments 1-10.

Embodiment 15. A carrier containing the computer program of embodiment 12, wherein the carrier is one of an electronic signal, an optical signal, a radio signal, or a computer readable storage medium.

Embodiment 16. A secondary cell radio access node (7) in a cellular communications network (1), comprising:
means determining whether support from a secondary cell (4) is required for a wireless device (2) to communicate with the radio access node (7);
means for calculating a modified channel condition outer-loop value for the secondary cell (4) in response to determining that support from the secondary cell (4) is required; and
means for using the modified channel condition outer-loop value in an initial activation decision step for the secondary cell (4).

Embodiment 17. A radio access node comprising:
a secondary cell support decision module operative to determine whether support from a secondary cell is required for a wireless device (2) to communicate with the radio access node (7);
a modified outer loop calculation module (58) operative to calculate a modified channel condition outer-loop value for the secondary cell (4) in response to determining that support from the secondary cell (4) is required; and
a secondary cell activation module (60) operative to use the modified channel condition outer-loop value in an initial activation decision step for the secondary cell (4).

The following acronyms are used throughout this disclosure.
- 3GPP 3$^{rd}$ Generation Partnership Project
- ASIC Application Specific Integrated Circuit
- BLER Bock Error Rate
- CA Carrier Aggregation
- CC Component Carrier
- CPU Central Processing Unit
- CQI Channel Quality Information
- CRS Cell Specific Reference Symbol
- CSI Channel State Information
- eNB Enhanced or Evolved Node B
- FPGA Field Programmable Gate Array
- LTE Long Term Evolution
- MAC Medium Access Control
- PCell Primary Cell
- PDCCH Physical Downlink Control Channel
- PUSCH Physical Uplink Shared Channel
- PUCCH Physical Uplink Control Channel
- PSCH Primary Synchronization Channel
- SCell Secondary Cell
- UE User Equipment
- E-UTRAN Evolved Universal Terrestrial Radio Access Network
- QoS Quality of Service
- RRC Radio Resource Control
- RRU Remote Radio Unit
- TS Technical Specification
- TX Transmit Those skilled in the art will recognize improvements and modifications to the embodiments of the present disclosure. All such improvements and modifications are considered within the scope of the concepts disclosed herein and the claims that follow.

What is claimed is:

1. A method of operating a radio access node comprising:
determining whether support from a secondary cell is required for a wireless device to communicate with the radio access node; and
in response to determining that support from the secondary cell is required,
calculating, based on a last known channel condition outer-loop value for the secondary cell, a modified channel condition outer-loop value for the secondary cell; and
using the modified channel condition outer-loop value in an initial activation decision step for the secondary cell, the initial activation decision step comprising either activating the secondary cell or refraining from activating the secondary cell, based on the calculated modified channel condition outer-loop value for the secondary cell.

2. The method of claim 1, wherein the initial activation decision step comprises activating the secondary cell in response to determining that the sum of a device reported channel condition value and the modified channel condition outer-loop value is above an activation threshold.

3. The method of claim 1 wherein calculating the modified channel condition outer-loop value for the secondary cell comprises setting the modified channel condition outer-loop value to be the maximum value between zero and the last known channel condition outer-loop value for the secondary cell.

4. The method of claim 2 further comprising:
setting an initial link adaptation channel condition outer-loop value to be the minimum value between zero and the last known channel condition outer-loop value for the secondary cell; and
following activating the secondary cell, using the initial link adaptation channel condition outer-loop value in an initial link adaptation step for the secondary cell.

5. The method of claim 1 wherein calculating the modified channel condition outer-loop value for the secondary cell comprises:
determining whether the last known channel condition outer-loop value for the secondary cell is negative; and
in response to determining that the last known channel condition outer-loop value is negative, setting the channel condition outer-loop value to be the sum of the last known channel condition outer-loop value and a small predefined positive adjustment constant; or
in response to determining that the last known channel condition outer-loop value is not negative, setting the channel condition outer-loop value to be zero.

6. The method of claim 1 wherein calculating the modified channel condition outer-loop value for the secondary cell comprises
determining whether the last known channel condition outer-loop value for the secondary cell is negative; and
in response to determining that the last known channel condition outer-loop value is negative, setting the channel condition outer-loop value to be the sum of the last known channel condition outer-loop value and a small predefined positive adjustment constant; and in response to determining that the last known channel condition outer-loop value is not negative, setting the channel condition outer-loop value to be the maximum value between zero and the last known channel condition outer-loop value.

7. The method of claim 2, further comprising a deactivation decision step, the deactivation decision step comprising:
   maintaining the secondary cell in the active state in response to determining that the sum of a device reported channel condition value and an updated channel condition outer-loop value is above a deactivation threshold below the activation threshold; and
   deactivating the secondary cell in response to determining that the sum of a device reported channel condition value and the updated channel condition outer-loop value is below the deactivation threshold.

8. The method of claim 7, wherein the deactivation decision step is performed subsequent to receiving a first negative acknowledgement (NACK) signal.

9. The method of claim 2 wherein activating the secondary cell comprises using a first stepsize in a set of initial iterations of an outer-loop adjustment algorithm (OLA), wherein the first stepsize defines a value by which the OLA algorithm is increased upon receipt of an acknowledgement (ACK) signal, wherein the first stepsize is used until the receipt of a negative acknowledgement (NACK) signal, after which a second stepsize, less than the first stepsize, is used.

10. The method of claim 1 wherein the radio access node is a base station.

11. A radio access node comprising circuitry, the circuitry containing instructions which when executed cause the radio access node to:
   determine whether support from a secondary cell is required for a wireless device to communicate with the radio access node; and
   in response to determining that support from the secondary cell is required,
   calculate, based on a last known channel condition outer-loop value for the secondary cell, a modified channel condition outer-loop value for the secondary cell; and
   use the modified channel condition outer-loop value in an initial activation decision step for the secondary cell, the initial activation decision step comprising either activating the secondary cell or refraining from activating the secondary cell, based on the calculated modified channel condition outer-loop value for the secondary cell.

12. The radio access node of claim 11, wherein said circuitry comprises
   at least one processor; and memory coupled to said processor, said memory comprising said instructions.

13. A radio access node for operating in a cellular communications network, comprising:
   a circuit for determining whether support from a secondary cell is required for a wireless device to communicate with the radio access node;
   a circuit for calculating, based on a last known channel condition outer-loop value for the secondary cell, a modified channel condition outer-loop value for the secondary cell in response to determining that support from the secondary cell is required; and
   a circuit for using the modified channel condition outer-loop value in an initial activation decision step for the secondary cell, the initial activation decision step comprising either activating the secondary cell or refraining from activating the secondary cell, based on the calculated modified channel condition outer-loop value for the secondary cell.

* * * * *